Figure 1:
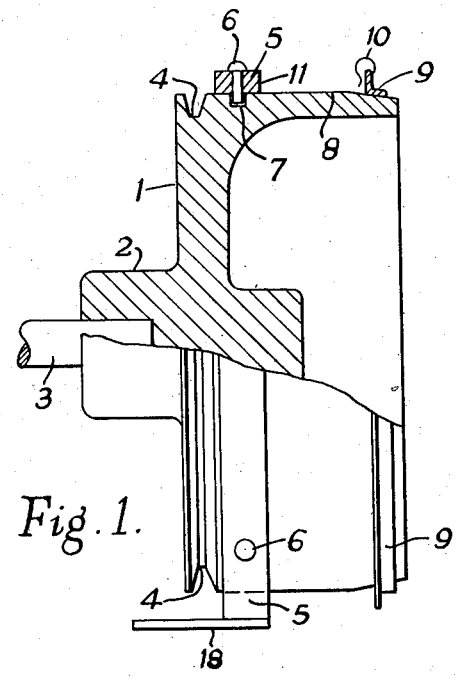

Jan. 17, 1961  B. H. PEDERSEN  2,968,334
PROCESS AND APPARATUS FOR PRODUCING SHEETS
OF THERMOPLASTIC MATERIAL
Filed May 9, 1957

INVENTOR
Bent Højberg Pedersen
BY
ATTORNEYS

United States Patent Office 2,968,334
Patented Jan. 17, 1961

2,968,334
PROCESS AND APPARATUS FOR PRODUCING SHEETS OF THERMOPLASTIC MATERIAL
Bent Hojberg Pedersen, 15 Norske Alle, Holte, Denmark
Filed May 9, 1957, Ser. No. 658,169
Claims priority, application Norway May 18, 1956
13 Claims. (Cl. 154—1.8)

One method of producing thermoplastic sheet material comprises winding an extruded filament or band on to a rotating drum or the like so as to form a tube, the juxtaposed convolutions being caused to adhere to one another, and then cutting the tube from end to end and opening it out into a sheet.

In this known method the synthetic filament or band is wound on to a drum or cylinder the length and circumference of which corresponds with the size of the sheet.

Usually, the synthetic filament is wound on over the whole length of the drum and while the tube thus formed is still on the drum, the tube is cut from end to end and removed from the drum. This method is quite complicated, because the various operations must be interrupted each time that a tube has been formed with a length which is at the most the same as the length of the drum. Also, the method makes relatively heavy demands on the machinery employed, more particularly if the tubes formed during the winding-on operation are to be relatively long, for in such case it will generally be necessary for the station whence the synthetic filament is guided on to the rotating drum to be displaced lengthwise thereof as winding-on progresses.

It will be seen therefore that the known process is necessarily intermittent, and the present invention is designed to provide a continuous process for the production of sheets from filaments or bands, and apparatus for carrying the process into effect.

According to the invention, a filament or band is wound on to a rotating member or former, the juxtaposed convolutions are caused to adhere to one another and the tube so formed is progressively displaced axially relatively to the rotating former. The axial displacement of the tube progresses at the same rate as the length of the tube is increased during the winding-on operation. Consequently, with this process it is possible to produce a tube from which shorter tubes of a desired length can be cut and then opened out to form sheets after being cut from end to end. Thus, referring to Figure 1, a tube of increasing length is continuously formed on the drum and after the tube has become of such length as to extend to the right in Figure 1 off the end of drum 1, the short length tubes may be severed therefrom. Obviously the right hand end of the increasing length tube may be suitably supported after it leaves the drum and during the severing operation. Alternatively, the tube can be cut along one side and opened out as it is being displaced axially, so as to produce a sheet having a width equal to the circumference of the rotating member or former, of indefinite length. It will be appreciated that the rotating former may comprise a drum which is relatively short axially, and consequently will be relatively light in weight, as compared with the rotating drum required for the known process referred to above.

Another advantage of this method is that the filament or band is always fed to the rotating former at the same region axially relatively to the rotating former, and this feature permits the use of simple filament or band feeding apparatus. It will also be appreciated that the feeding of the filament to the former can be manually accomplished.

Apparatus for carrying out the method according to the invention comprises a fixed stop or abutment disposed adjacent to a rotary drum or former, means for feeding a filament or band to the drum or former so as to engage with the fixed stop, and means for causing the juxtaposed convolutions wound on to the drum or former to adhere to one another.

In one embodiment of the process according to the invention, the end of the filament employed is releasably secured to the winding member or former at some axial distance from the stop or abutment, and a number of turns are wound on until the filament approaches the stop member, whereafter the subsequent turns are continuously adhered together during the winding-on operation, for instance, by spraying with acetone or other solvent, or an adhesive substance. Alternatively adhesion may be effected by heating the filaments. Preferably, the winding member will decrease slightly in diameter in the direction away from the stop member in order that the resistance to displacement of the tube formed during winding-on may not be excessive, and the first turns to be produced will therefore generally be smaller in diameter than the turns wound on to the winding member directly after the stop member.

The synthetic filament to be wound on can be supplied from supply reels or directly from a spinneret or extrusion nozzle in which the filament is formed. More particularly in the latter case, the filament can be wound on satisfactorily without any interruptions and pieces of a suitable length can be cut subsequently from the tube produced. Preferably, however, according to the invention the adhesion operation is interrupted after a predetermined length of tube has been produced, whereafter a new length of tube is started without interruption of the filament. If sticking is produced by spraying acetone, such spraying can be interrupted at suitable intervals over a length of filament corresponding to one or more turns. In this way it is possible to produce seriatim an arbitrary number of tubular members which are of predetermined and possibly varying lengths, and which are connected to one another for the reason that the filament continues from one tubular member to a subsequent tubular member, although the tubular members can readily be separated from one another by severing the connecting filament.

The synthetic filament employed can be of any desired cross-section. Preferably, a lightweight tubular synthetic filament of circular cross-section will be used which, under the pressure applied during winding-on, can be brought to a substantially rectangular or possibly square shape in cross-section. A hollow filament of this kind can give the finished product considerable strength for a relatively light weight. However, the same advantage can also be obtained with synthetic filaments of other cross-sectional shapes. For instance, the filament may be substantially Z-shaped in cross-section and may be wound on in such manner that the two arms of the profile form the surface layers in the finished sheet, while the profile body forms internal strengthening ribs for the sheet.

The finished material in sheet or plate form can be used for widely differing purposes. For instance, it can be used for packing, as insulating sheets, insulating mats and for furniture. Also, the sheet material can be used for producing vacuum-shaped or heat-pressed articles such as, for instance, fluorescent light fittings or the like. The strength and appearance of the sheet material can be varied according to the purpose for which it is required, more particularly by choosing a suitable starting material. If a transparent synthetic filament is used, the finished sheets can also be used as windows which, although not really transparent, will be translucent.

The invention also relates to an apparatus for carrying out the process hereinbefore described. The apparatus is distinguished in that it has a short rotating drum which is rotatably mounted with one end free and a stop member disposed at or near the other end for engagement with the filament while the same is being wound on the drum. The stop member can, if required, be rigidly secured to the drum so as to rotate therewith, but in practice the stop member will preferably be stationary. The stop member may comprise a ring which surrounds the drum and engages with the drum surface with little friction. The filament engaging edge of the ring extends conveniently only over a part, preferably about half, of the periphery of the ring along a helix rising axially of the drum. If the said edge were formed as a helix around the complete periphery, the tube formed during the winding-on would constantly be displaced in its entirety along the winding drum. In such a case the friction between the tube produced and the drum surface might become insufficient to entrain the filament reliably. This disadvantage is obviated if the axial displacement of the tube is at every instant effected only over a suitably small part of the tube periphery.

Figure 2:
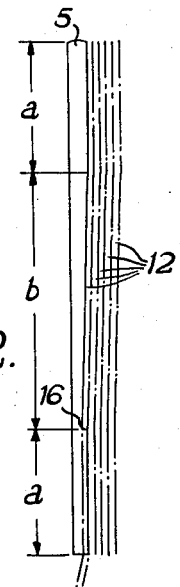
Figure 3:
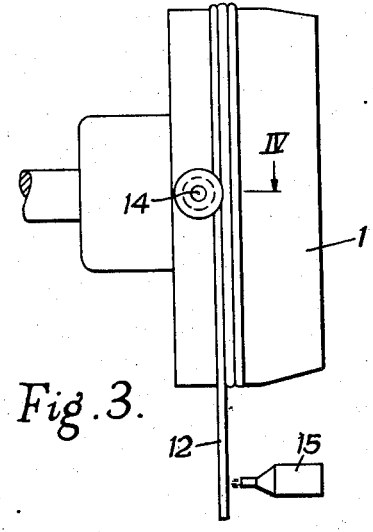
Figure 4:
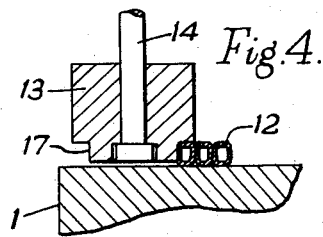

In order that the invention may be clearly understood and readily carried into effect, apparatus according to the invention will now be more particularly described, by way of example only, with reference to the accompanying drawings wherein:

Fig. 1 is a side elevation, partly in axial section, of a first embodiment of the apparatus, Fig. 2 is a developed view of a ring which serves as a stop member and with which a number of filament turns are shown in engagement, Fig. 3 is a diagrammatic plan view of a second embodiment of apparatus according to the invention, and Fig. 4 is a sectional view, taken along the line IV—IV of Fig. 3, through the stop member of the apparatus and through the co-operating part of the winding drum.

Figure 5:
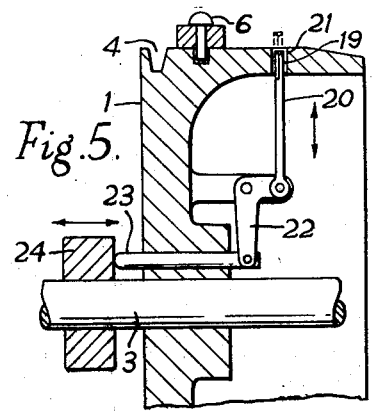

Fig. 5 is a detail sectional view showing a cutting device carried by the winding drum.

Referring to Fig. 1, a relatively short, drum-like member 1 having a hub 2 is rotatably mounted on a bearing shaft 3. A groove 4 is formed in the left-hand end portion of the drum surface to receive a V belt (not shown) by means of which the drum can be rotated. This V-belt may be drivingly connected to any conventional driving means such as a motor or other suitable prime mover. A ring 5 is fitted around the drum immediately to the right of the groove 4, the ring 5 does not rotate with the drum but is guided thereon by means of a number of screws 6 or similar guide pins which engage in a groove 7 extending around the surface of the drum. The ring 5 may be held against rotation in any convenient manner, for example, a bracket 18 may be attached to the ring and be also secured to any convenient stationary member. To the right of the ring 5 the surface of the drum 1 has a slightly conical part 8 on which a loose ring 9 is fitted and is retained thereon by friction.

At the commencement of winding-on, the end of the filament is secured to the loose ring 9 by means of a resilient clip or clamp 10. When the drum is thereafter rotated, the filament is wound from the filament feed apparatus hereinbefore referred to onto the drum 1 between the ring 9 and the ring 5 which serves as stop member, until it engages with the face 11 of the ring 5. The righthand lateral surface 11 of the ring 5 extends as shown in the developed view shown in Fig. 2. Over a section $a$ which extends over substantially one-half of the periphery of the ring 5, the said lateral surface 11 is disposed in a plane perpendicular to the axis of the drum 1, whereas over a section $b$ comprising the remainder of the periphery of the ring 5, the side 11 extends along a helical or spiral path. Such path starts at 16 with an incision in the ring of the same depth as the thickness of the filament employed. When the filament is introduced into the said incision during the winding-on operation, the filament will, when it is drawn by the drum over the section $b$, clamp the turns 12 already wound on. The finished tube will therefore be displaced continuously axially of the section $b$ but not on the section $a$. During this operation the ring 9 is forced off the drum, and a tube consisting of turns of filament is produced as hereinbefore described. It is apparent that when the ring 9 is forced off the drum 1, it will tend to fall to the floor unless it is caught by the operator or supported in some other fashion and unclipped from the leading end of the filament. As the continuous coil of filament is formed on the drum 1 and begins to axially progress off of the drum surface, it may be supported in any suitable fashion that is desired.

If required, the stop ring 5 can be adjustable circumferentially around the drum 1 so that the beginning of the section $b$ can be disposed in suitable relationship to the place where the filament is fed to the drum 1.

In the embodiment illustrated in Figs. 3 and 4, the drum 1 may be constructed in substantially the same way as the drum shown in Fig. 1 but, as can be seen in Figs. 3 and 4, the stop ring 5 is replaced by a roller 13 rotatable upon a spindle 14 extending radially of the drum 1. As shown in Figure 4, roller 13 is mounted independently of drum 1 and it rotates about the fixed axis of spindle 14 which is radial with respect to drum 1. By way of a nozzle 15, acetone or other solvent or adhesive can be sprayed on to the filament 12 immediately before the filament reaches the drum 1. It will be understood that a similar nozzle may be provided for the arrangement shown in Fig. 1.

The winding of the filament 12 on to the drum 1 as shown in Figs. 3 and 4 can be initiated in the same way as explained with reference to Fig. 1. After a number of filament turns have been wound on to the drum, the filament enters into bearing relationship with the side of the roller 13 which can rotate freely on the spindle 14. The roller 13 has the same effect as the stop ring 5 shown in Fig. 1, causing progressive axial displacement of the filament turns along the drum 1.

The filament 12 is assumed to be initially tubular or circular in cross-section but, as shown in Fig. 4, the cross-sectional shape changes during winding-on to a substantially square shape. For this purpose, the stop roller 13 has a peripheral groove 17, the two sides of which are substantially perpendicular to one another. During winding-on, the roller 13 exerts a lateral thrust upon the filament 12 such that it substantially fills the groove 17 and assumes the cross-sectional shape of the groove.

By means of the apparatus described, a tube of any desired length can be produced in a continuous operation, and the tube produced can be subdivided during production into suitable tubular members if the spraying of solvent or adhesive through the nozzle 15 is stopped. If the adhesion of the filament is interrupted over a length greater than the drum periphery, the finished tube will break when it passes beyond the free end of the drum. The loose filament must then be cut to release the completed cylindrical member from the succeeding cylindrical member in process of being wound on the drum.

Striped tubes or sheets can be produced by winding two or more filaments side by side on to the drum simultaneously. These side by side filaments may have different properties such as different color and different degrees of transparency. In such a case the incision 16 will be of a depth corresponding to the total thickness of two or more filaments as the case may be. Furthermore a solvent or adhesive must be applied between the individual filaments during winding-on in order that juxtaposed filaments of the finished cylinder will adhere together.

It will be appreciated that although the invention is primarily intended for the production of sheet material from thermoplastic filaments or bands, for example cellulose acetate or similar plastics, other filaments, bands or threads of material which is flexible at room temperature may be employed. For example, threads or bands of paper may be used.

As previously stated, the tube can be cut along one side as it is being displaced axially over the drum. Any convenient cutting means may be provided for this purpose, for example, a knife may be secured on the drum so as to project radially outwards with its cutting edge facing towards the end of the drum where the filament is being fed to the drum. Such a knife is indicated at 19 in Figure 5.

Alternatively the knife may be retractable and such an arrangement is shown in Figure 5. In Figure 5, the knife 19 is carried on the outer end of a rod 20 as as to be movable to project through an opening 21 in the drum 1, the projected position being indicated in dotted lines. The inner end of the rod 20 is pivoted to one arm of a bell-crank lever 22 the other end of which is pivoted to a push rod 23 adapted to be engaged by a pressure ring 24 which is slidable but does not rotate with the shaft 3. Any convenient means, for example electric or hydraulic or mechanical may be provided for moving the pressure ring to cause projection of the knife 19. The knife 19 can therefore be brought into operation as and when desired either for continuously cutting the tube, or for intermittently cutting those convolutions which have not been caused to adhere to adjacent convolutions.

I claim:

1. A process for forming sheet material comprising the steps of providing a continuous flexible filament, releasably securing the leading end of said filament to a rotatable cylindrical former at a position near one free end thereof, helically winding a plurality of juxtapositioned convolutions of said filament between said leading end of the filament and a stop near the other end of the former by rotating said former whereby a closed coil is formed between said leading edge and said stop, and thereafter progressively displacing said coil by continuing to wind said filament on said former and releasing said leading end to form a continuous coil, applying an adhesive for adhering juxtapositioned convolutions of the filament to one another to form a tube, cutting the formed tube along one side thereof and opening out said tube into sheet form.

2. A process as defined in claim 1, including the step of interrupting the application of adhesive to said convolutions for at least one complete revolution of said former after a predetermined length of said tube has been produced.

3. A process as defined in claim 1, including the step of simultaneously feeding at least two filaments side by side to said former and adhering said filaments to one another as well as to juxtaposed convolutions wound on said former.

4. A process as defined in claim 3, wherein said at least two filaments have different properties of the class including different colors and different degrees of transparency.

5. An apparatus for forming sheet material comprising a drum of relatively short axial length, means for mounting said drum for rotation about an axis leaving one end of said drum free, a stop member spaced apart axially from said free end of said drum and adjacent to the periphery of said drum, an annular member slidably mounted and rotatable with said drum near the free end thereof in light frictional engagement with the surface of said drum and in axially spaced relation to said stop member, means for removably securing the leading end of a continuous flexible filament to said annular member, means for rotating said drum so that when filament is fed thereto the filament is wound around said drum between said annular member and said stop member to form a tube, said stop member having an exposed camming surface engageable with the filament wound on said drum to axially displace the filament tube formed on said drum and thereby to cause said tube to axially shift said annular member toward the free end of said drum, and said drum being formed with an unobstructed peripheral surface between the free end thereof and said annular member to provide for the displacement of said annular member off the free end of said drum, and means for applying adhesive to said filaments so that adjacent convolutions of the filaments wound on said drum adhere together to form the tube.

6. Apparatus as defined in claim 5, wherein said stop member is stationary relatively to said drum.

7. The apparatus as defined in claim 6 wherein said stop member comprises a ring encircling said drum and having a helically contoured cam surface adapted to radially engage the filament as it is wound on said drum.

8. Apparatus as defined in claim 5, wherein said stop member comprises a roller mounted for free rotation about an axis which is radial relative to said drum.

9. Apparatus as defined in claim 8, including a peripheral groove around said roller, the cross-sectional shape of said groove corresponding with the desired cross-sectional shape of said filament.

10. Apparatus as defined in claim 5, including means mounting said stop member for circumferential adjustment around said drum.

11. Apparatus as defined in claim 5, wherein said drum is formed with a slight taper for part of its length from its free end.

12. Apparatus as defined in claim 5, including means for cutting the formed tube axially during axial displacement of said tube over said drum.

13. An apparatus for forming sheet material comprising a drum of relatively short axial length, means for mounting said drum for rotation about its axis leaving one end of said drum free, a stop member spaced apart axially from said free end of said drum and adjacent to the periphery of said drum, means for rotating said drum relative to said stop member for winding a continuous flexible filament therearound to form a tube on said drum, said stop member having a continuous substantially smooth exposed radially projecting camming surface facing the free end of said drum in unobstructed communication with the periphery of said drum whereon the filament tube is adapted to be formed, and said camming surface being engageable with said filament being wound on said drum to thereby urge said filament and the tube formed thereby axially along the drum to form a continuous tube, and means for applying adhesive to said filaments so that adjacent convolutions of the filaments wound on the drum adhere together to form said tube.

References Cited in the file of this patent

UNITED STATES PATENTS

| | | |
|---|---|---|
| 785,321 | McLaughlin | Mar. 21, 1905 |
| 1,217,879 | Pye | Feb. 27, 1917 |
| 1,573,220 | Clauss | Feb. 16, 1926 |
| 2,081,060 | Modigliani | May 18, 1937 |
| 2,131,024 | Cordts | Sept. 27, 1938 |
| 2,609,320 | Modigliani | Sept. 2, 1952 |
| 2,723,215 | Biefeld et al. | Nov. 8, 1955 |
| 2,792,324 | Daley et al. | May 14, 1957 |
| 2,845,109 | Schneider | July 29, 1958 |
| 2,882,673 | Buddecke | Apr. 21, 1959 |